United States Patent
Kim et al.

(10) Patent No.: US 10,401,809 B2
(45) Date of Patent: Sep. 3, 2019

(54) METHOD FOR CONTROLLING ROTATING APPARATUS AND ELECTRONIC DEVICE THEREOF

(71) Applicant: Samsung Electronics Co., Ltd., Suwon-si, Gyeonggi-do (KR)

(72) Inventors: Younhyoung Kim, Yongin-si (KR); Junhui Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 15/014,680

(22) Filed: Feb. 3, 2016

(65) Prior Publication Data

US 2016/0224034 A1 Aug. 4, 2016

(30) Foreign Application Priority Data

Feb. 4, 2015 (KR) .................. 10-2015-0017444

(51) Int. Cl.
| | |
|---|---|
| G05B 15/02 | (2006.01) |
| G05D 13/00 | (2006.01) |
| G01B 11/26 | (2006.01) |
| G01P 3/486 | (2006.01) |
| G01P 3/54 | (2006.01) |
| G01P 13/04 | (2006.01) |
| G01P 21/02 | (2006.01) |
| G01D 5/347 | (2006.01) |

(52) U.S. Cl.
CPC ............. *G05B 15/02* (2013.01); *G01B 11/26* (2013.01); *G01D 5/347* (2013.01); *G01P 3/486* (2013.01); *G01P 3/54* (2013.01); *G01P 13/04* (2013.01); *G01P 21/02* (2013.01); *G05D 13/00* (2013.01); *G01D 5/34792* (2013.01)

(58) Field of Classification Search
CPC . G01P 3/36; G01P 3/486; G01B 11/26; G05B 15/02; G05D 13/00
See application file for complete search history.

(56) References Cited

U.S. PATENT DOCUMENTS

| | | | | |
|---|---|---|---|---|
| 4,449,191 A | * | 5/1984 | Mehnert | ............... G01P 3/4802 250/231.16 |
| 4,693,619 A | | 9/1987 | Ishii et al. | |
| 4,757,196 A | * | 7/1988 | Yamada | ............. G01D 5/34707 242/534 |
| 4,774,494 A | | 9/1988 | Extance et al. | |

(Continued)

FOREIGN PATENT DOCUMENTS

EP 0560520 A1 9/1993

OTHER PUBLICATIONS

European Office Action dated Mar. 13, 2019, issued in European Application No. 16154303.8.

*Primary Examiner* — Darrin D Dunn
*Assistant Examiner* — Santosh R Poudel
(74) *Attorney, Agent, or Firm* — Jefferson IP Law, LLP

(57) ABSTRACT

An apparatus and a method for controlling a rotating body in an electronic device are provided. The method includes emitting light to at least one indicator among a plurality of indicators having different reflectivities in a rotating body, receiving light reflected from the at least one indicator, detecting a rotation parameter of the rotating body based on an amount of the reflected light received from the at least one indicator, and controlling the rotating body based on the rotation parameter.

16 Claims, 13 Drawing Sheets

(56) References Cited

U.S. PATENT DOCUMENTS

| | | | |
|---|---|---|---|
| 5,659,472 A * | 8/1997 | Nishino | B62D 5/0487 |
| | | | 701/41 |
| 5,747,797 A * | 5/1998 | Fujita | G01D 5/2455 |
| | | | 250/231.14 |
| 6,601,513 B1 | 8/2003 | Ozawa | |
| 6,639,206 B1 * | 10/2003 | Rothamel | G01D 5/347 |
| | | | 250/231.13 |
| 6,750,445 B1 * | 6/2004 | Sakai | G01D 5/34715 |
| | | | 250/231.13 |
| 2003/0040883 A1 * | 2/2003 | Ermer | G01P 3/486 |
| | | | 702/145 |
| 2004/0022135 A1 * | 2/2004 | Yiu | G04C 3/14 |
| | | | 368/187 |
| 2004/0079591 A1 | 4/2004 | Mueller | |
| 2004/0109718 A1 * | 6/2004 | Ikeno | B41J 11/0095 |
| | | | 400/708 |
| 2004/0134806 A1 * | 7/2004 | Ferguson | G11B 23/0021 |
| | | | 206/307 |
| 2005/0201234 A1 * | 9/2005 | Hanks | G11B 19/28 |
| | | | 369/47.38 |
| 2006/0113942 A1 * | 6/2006 | Amagasa | B60S 1/08 |
| | | | 318/443 |
| 2007/0077041 A1 * | 4/2007 | Onishi | G11B 19/04 |
| | | | 386/277 |
| 2007/0207057 A1 * | 9/2007 | Fujimoto | G01N 35/00069 |
| | | | 422/64 |
| 2014/0145071 A1 * | 5/2014 | Uozumi | G01D 5/34792 |
| | | | 250/231.1 |
| 2014/0217951 A1 | 8/2014 | Sugihara et al. | |

* cited by examiner

METHOD FOR CONTROLLING ROTATING APPARATUS AND ELECTRONIC DEVICE THEREOF

CROSS-REFERENCE TO RELATED APPLICATION(S)

This application claims the benefit under 35 U.S.C. § 119(a) of a Korean patent application filed on Feb. 4, 2015 in the Korean Intellectual Property Office and assigned Serial number 10-2015-0017444, the entire disclosure of which is hereby incorporated by reference.

TECHNICAL FIELD

The present disclosure relates to an electronic device. More particularly, the present disclosure relates to an apparatus and a method for controlling a rotating body in an electronic device.

BACKGROUND

With advances in information communication technology and semiconductor technology, various industrial devices and robots are widely used in industries. To effectively operate such industrial devices and robots, a method for controlling a device (e.g., a rotating body) to drive a driving body is desired. For example, such a device may be controlled by installing a limit switch therein such that an electronic device electrically senses the limit switch installed in the corresponding device. Also, the device may be controlled by calculating a rotation amount of the device which rotates and controlling a rotation speed of the device.

A device of the related art (e.g., a rotating body) for driving the driving body is subject to a rotation deviation of the rotating body according to continuous motor control (e.g., motor abrasion) and an uneven revolutions per minute (RPM) of a motor as time passes. In a malfunction caused by an external pressure or shock, or a power failure, the rotating body for driving the driving body may repeat an existing operation and have difficulty in rapidly finding a starting point (e.g., a reference position) of the device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for detecting a rotation parameter of a rotating body based on an amount of received light corresponding to indicators having different reflectivities of the rotating body, and controlling the rotating body based on the detected rotation parameter in an electronic device.

In accordance with an aspect of the present disclosure, a method for operating an electronic device is provided. The method includes emitting light to at least one indicator among a plurality of indicators having different reflectivities in a rotating body, receiving light reflected from the at least one indicator, detecting a rotation parameter of the rotating body based on an amount of the reflected light received from the at least one indicator, and controlling the rotating body based on the rotation parameter.

In accordance with another aspect of the present disclosure, an electronic device is provided. The electronic device includes a rotating body comprising a plurality of indicators having different reflectivities, a detector comprising a light emitter configured to emit light to at least one indicator of the plurality of indicators and a light receiver configured to receive light reflected from the at least one indicator, and a processor configured to detect a rotation parameter of the rotating body based on an amount of the reflected light received from the at least one indicator, and to control the rotating body based on the rotation parameter.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
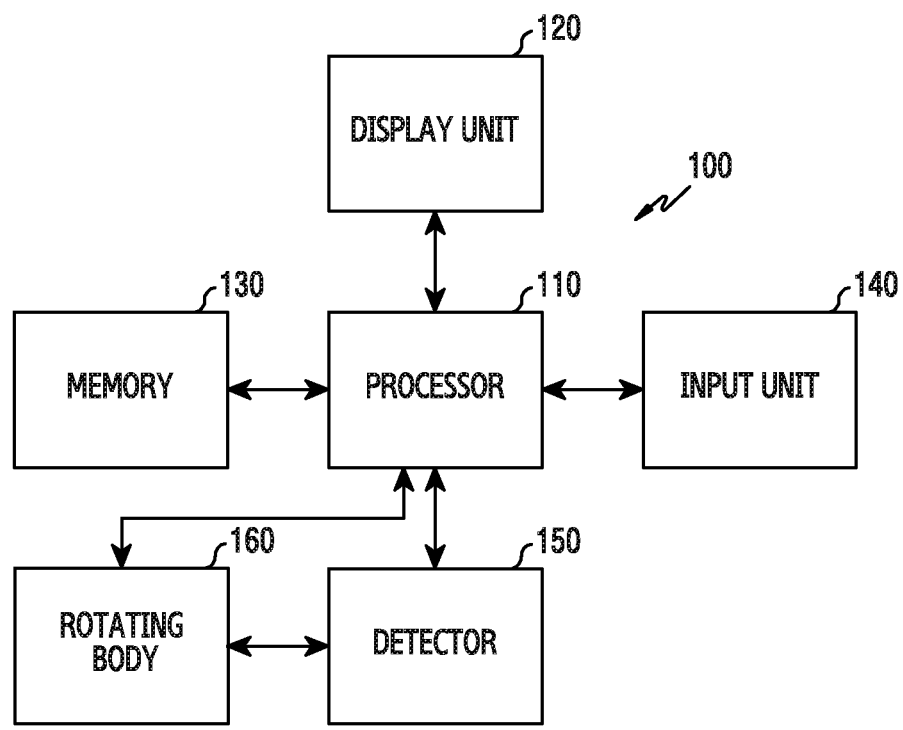
FIG. 1 illustrates an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An expression "have", "may have", "include" or "may include" or the like used in the present document is intended to indicate a presence of a corresponding characteristic (e.g., a number, a function, an operation, or a constitutional element such as a component), and should be understood that there are additional possibilities of one or more other characteristics.

In the present disclosure, an expression "A or B", "A and/or B", or "one or more of A and/or B" or the like may include all possible combinations of items enumerated together. For example, "A or B", "at least one of A and B", or "at least one of A or B" may indicate all cases where (1) at least one A is included, (2) at least one B is included, and (3) at least one A and at least one B are both included.

Although expressions used in various embodiments of the present disclosure such as "1st", "2nd", "first", "second" or the like may be used to express various constitutional elements, it is not intended to limit an order and/or importance thereof. The above expressions may be used to distinguish one element from another element. For example, a 1st user device and a 2nd user device may indicate different user devices irrespective of an order or importance thereof. For example, a 1st element may be termed a 2nd element, and similarly, the 2nd element may be termed the 1st element without departing from the scope of the present disclosure.

When a certain element (e.g., the 1st element) is mentioned as being "operatively or communicatively coupled with/to" or "connected to" a different element (e.g., the 2nd element), it is to be understood that the certain element is directly coupled with/to another element or may be coupled with/to the different element via another element (e.g., a 3rd constitutional element). On the other hand, when the certain element (e.g., the 1st element) is mentioned as being "directly coupled with/to" or "directly connected to" the different element (e.g., the 2nd element), it may be understood that another element (e.g., the 3rd constitutional element) is not present between the certain element and the different element.

An expression "configured to" used in the present disclosure may be interchangeably used with, for example, "suitable for", "having the capacity to", "designed to", "adapted to", "made to", or "capable of" according to a situation. A term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in a memory device.

Unless otherwise defined, all terms (including technical and scientific terms) used herein have the same meaning as commonly understood by those ordinarily skilled in the art to which various embodiments of the present disclosure belong. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the present document should not be interpreted to exclude the various embodiments of the present disclosure. Moreover, unless specified to the contrary, elements of different embodiment may be interchanged.

An electronic device according to various embodiments of the present disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, and a wearable device (e.g., smart glasses, a head-mounted-device (HMD), a smart mirror, or a smart watch).

According to various embodiments of the present disclosure, the electronic device may be a smart home appliance. For example, the smart home appliance may include at least one of a television (TV), a digital versatile disc (DVD) player, an audio device, a refrigerator, an air conditioner, a cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™, PlayStation™), and a camcorder.

According to various embodiments of the present disclosure, the electronic device may include at least one of various medical devices (e.g., various portable medical measurement devices (i.e., a blood glucose monitoring device, a heart rate monitoring device, a blood pressure measuring device, a body heat measuring device, etc.), magnetic resonance angiography (MRA), magnetic resonance imaging (MRI), computed tomography (CT), imaging equipment, ultrasonic instrument, etc.), a navigation device, a global positioning system (GPS) receiver, an event data recorder (EDR), a flight data recorder (FDR), a car infotainment device, an electronic equipment for a ship (e.g., a vessel navigation device, a gyro compass, etc.), avionics, a security device, a vehicle head unit, an industrial or domestic robot, an automatic teller machine (ATM ) of a financial institution, a point of sales (POS) of a retail shop, and devices associated with the Internet of things (e.g., a light bulb, various sensors, an electric or gas meter, a sprinkler device, a fire alarm, a thermostat, a streetlamp, a toaster, fitness equipment, a hot water tank, a heater, a boiler, etc.).

According to various embodiments of the present disclosure, the electronic device may include at least one of furniture, a part of a building/construction, an electronic board, an electronic signature receiving device, a projector, and various measurement machines (e.g., water supply, electricity, gas, propagation measurement machine, etc.).

In various embodiments of the present disclosure, the electronic device may be one or more combinations of the aforementioned various devices. In an embodiment of the present disclosure, the electronic device may be a flexible device. In addition, the electronic device according to the various embodiments of the present disclosure is not limited to the aforementioned devices, and may include a new electronic device based on technical advances.

Hereinafter, an electronic device according to various embodiments of the present disclosure will be described with reference to the accompanying drawings. In the present document, a term 'user' may refer to a person who uses the electronic device or a device which uses the electronic device (e.g., an artificial intelligence (AI) electronic device).

Now, various embodiments of the present disclosure provide a technique for controlling a rotating body (or a rotator) in an electronic device.

FIG. 1 is a block diagram of an electronic device according to an embodiment of the present disclosure.

Referring to FIG. 1, the electronic device 100 may include a processor (or a controller) 110, a display unit (or a display) 120, a memory 130, an input unit 140, a detector 150, and a rotating body 160. The electronic device 100 may omit at least one of those components, or include another component.

Although not depicted, the electronic device 100 may further include a bus which is a circuit for interconnecting the components (e.g., the processor 110, the display unit 120, the memory 130, the input unit 140, a detector 150, and the rotating body 160) and delivering communications (e.g., control messages) between the components.

The processor 110 may include one or more of a CPU and an application processor (AP). The processor 110 may, for example, control at least one other component of the electronic device 100 and/or process communication operation or data.

The processor 110 may control to emit light to at least part of indicators having different reflectivities of the rotating body 160. The indicators may have different reflectivities using at least one of different colors, saturations, and marks. For example, the processor 110 may control a light emitter of the detector 150 to emit the light to one or more indicators disposed on an outer surface of the rotating body 160.

The processor 110 may control to receive light reflected from the indicators. For example, using a light receiver of the detector 150, the processor 110 may detect an amount of the received light reflected from one or more indicators disposed on the outer surface of the rotating body 160. For example, using the detector 150, the processor 110 may detect the amount of the received light reflected from one or more reference indicators disposed at a reference position of the rotating body 160.

The processor 110 may detect a rotation parameter of the rotating body 160 based on the received amount of light corresponding to the indicators of the rotating body 160. The rotation parameter may include at least one of a reference position, a rotation speed, a rotation angle, a rotation direction, and a rotation amount of the rotating body 160. For example, the processor 110 may have a table of values of received amounts of light corresponding to one or more indicators disposed in the outer surface of the rotating body 160. That is, the processor 110 may determine which indicator(s) the detected received amount of light corresponds to. Hence, the processor 110 may detect the rotation parameter of the rotating body 160 by comparing the received amount of light corresponding to the indicators with the table of values of received amounts of light.

The processor 110 may detect a malfunction of the rotating body 160 based on the rotation parameter of the rotating body 160. The malfunction of the rotating body 160 indicates a rotation speed deviation of the rotating body 160. The malfunction of the rotating body 160 may be caused by an external pressure or shock. For example, the processor 110 may detect the malfunction of the rotating body 160 by comparing at least one of the rotation speed, the rotation angle, and the rotation amount of the rotation parameter with at least one of a reference rotation speed, a reference rotation angle, and a reference rotation amount.

Upon detecting the malfunction of the rotating body 160, the processor 110 may re-drive the rotating body 160 based on the reference position of the rotation parameter of the rotating body 160. In response to the malfunction of the rotating body 160, the processor 110 may stop the driving the rotating body 160. For example, the processor 110 may turn the rotating body 160 to the reference position of the rotation parameter and then re-drive the rotating body 160. For example, the processor 110 may turn the rotating body 160 from a current position to the reference position and then re-drive the rotating body 160. When the rotation parameter includes a plurality of reference positions, the processor 110 may turn the rotating body 160 to a reference position near the current location and then re-drive the rotating body 160.

When detecting the malfunction of the rotating body 160, the processor 110 may correct the rotation speed of the rotating body 160 based on the rotation parameter of the rotating body 160. For example, the processor 110 may compare the detected rotation parameter with a reference rotation parameter and thus correct the rotation speed of the rotating body 160 based on a calculated correction value. For example, the processor 110 may calculate the correction value of the rotation speed by determining how much the rotation speed of the detected rotation parameter is lower or higher than the reference rotation speed. The processor 110 may correct the rotation speed of the rotating body 160 based on the calculated correction value. That is, when the detected rotation speed is lower than the reference rotation speed, the processor 110 may increase the rotation speed of the rotating body 160. When the detected rotation speed is higher than the reference rotation speed, the processor 110 may decrease the rotation speed of the rotating body 160.

The display unit 120 may include a display for displaying data such as various contents (e.g., texts, images, video, icons, or symbols). For example, the display unit 120 may include a liquid crystal display (LCD), a light emitting diode (LED) display, an organic LED (OLED) display, a microelectromechanical system (MEMS) display, or an electronic paper display.

The memory 130 may store a command or data (e.g., device performance) relating to at least one other component of the electronic device 100. The memory 130 may store an application program installed in the electronic device 100 and software and/or program for operating the electronic device 100. For example, the memory 130 may have the table of values of the received amounts of light corresponding to the indicators of the rotating body 160. The memory 130 may include a volatile memory and/or a non-volatile memory.

The input unit 140 may include an input means for forwarding a command or data input from a user or an external device to the other component(s) of the electronic device 100. For example, the input unit 140 may include a key pad, a dome switch, a physical button, a touch panel, a jog & shuttle, and a sensor.

The detector 150 may include a light emitter for emitting light to at least part of the indicators having the different reflectivities in the outer surface of the rotating body 160, and a light receiver for receiving the light reflected from the indicators. For example, the detector 150 may detect the received amount of light by receiving the light reflected from the indicators disposed in the outer surface of the rotating body 160. The detector 150 may provide the detected received amount of light to the processor 110. The detector 150 may employ, but not limited to, a photosensor including an infrared LED.

The rotating body 160 may make a rotary motion under control of the processor 110. For example, the rotating body 160 may include the rotation parameter according to the rotary motion. The rotation parameter may include at least one of the reference position, the rotation speed, the rotation angle, the rotation direction, and the rotation amount of the rotating body 160.

The indicators having the different reflectivities may be disposed in the outer surface of the rotating body 160. The indicators may have the different reflectivities using at least one of different colors, saturations, and marks. For example, the indicators may be disposed at regular or different intervals on at least one of an upper surface, a lower surface, an outside surface, and an inside surface of the rotating body 160. For example, some of the indicators of the rotating body 160 may indicate the reference position of the rotating body 160.

The reference position may be a starting point where a series of operations commences.

Figure 2:
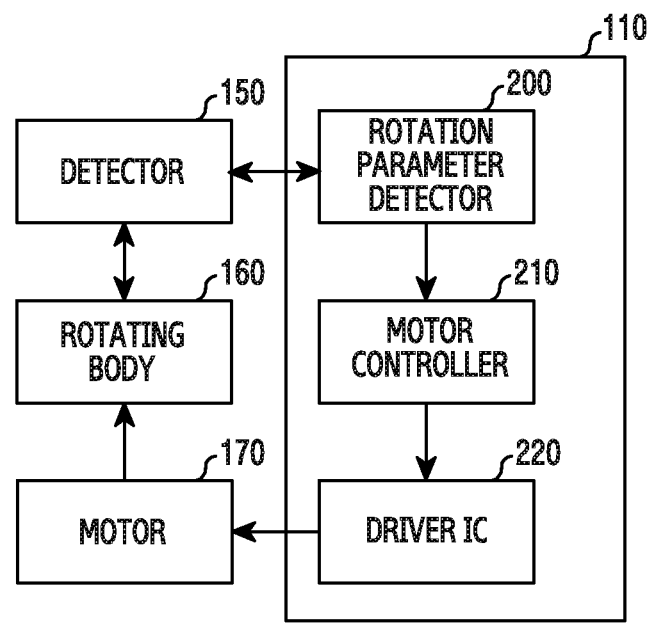
FIG. 2 illustrates a processor according to an embodiment of the present disclosure.

FIG. 2 is a block diagram of a processor according to an embodiment of the present disclosure.

Referring to FIG. 2, the processor 110 may include a rotation parameter detector 200, a motor controller 210, and a driver integrated circuit (IC) 220. The processor 110 may omit at least one of the components and further include another element. The motor controller 210 and the driver IC 220 may be constructed independently from the processor 110 and controlled by the processor 110.

The detector 150 may emit the light to at least some of the indicators having the different reflectivities on the outer surface of the rotating body 1690, and detect the received amount of light by receiving the light reflected from the indicators. For example, the detector 150 may provide the detected received amount of light to the rotation parameter detector 200.

The rotation parameter detector 200 may receive from the detector 150 the received amount of light corresponding to the indicators of the rotating body 160. For example, the rotation parameter detector 200 may detect the rotation parameter of the rotating body 160 based on the received light amount. The rotation parameter may include at least one of the reference position, the rotation speed, the rotation angle, the rotation direction, and the rotation amount of the rotating body 160.

The rotation parameter detector 200 may control the rotating body 160 based on the detected rotation parameter. For example, the rotation parameter detector 200 may provide a driving signal of the rotating body 160 to the motor controller 210 based on the detected rotation parameter.

The motor controller 210 may receive the driving signal of the rotating body 160 from the rotation parameter detector 200. The motor controller 210 may control the motor 170 through the driver IC 220. For example, the motor controller 210 may forward the driving signal of the rotating body 160 to the driver IC 220.

The driver IC 220 may receive the driving signal of the rotating body 160 from the motor controller 210. For example, the driver IC 220 may convert the received driving signal to a motor driving power and provide the motor driving power to the motor 170.

The motor 170 may be driven with the power from the driver IC 220, and rotate the rotating body 160 at a constant rotation speed. For example, the motor 170 may be driven with a torque and a revolutions per minute (RPM) defined through gear ratio control.

The rotating body 160 may be rotated by the motor 170 at a constant rotation speed. The indicators having the different reflectivities may be disposed on the outer surface of the rotating body 160.

Figure 3:
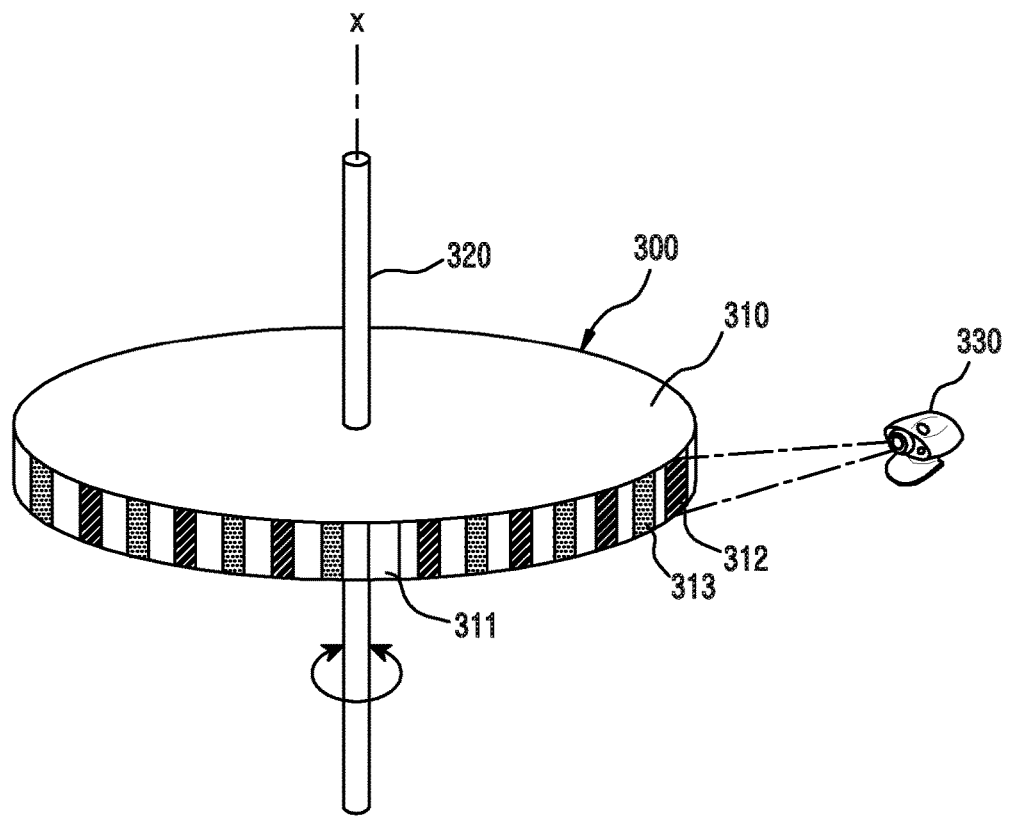
FIG. 3 illustrates a rotating body including indicators according to an embodiment of the present disclosure.

FIG. 3 depicts a rotating body including indicators according to an embodiment of the present disclosure.

Referring to FIG. 3, the rotating body 300 may be formed in a circle based on a rotation axis 320. The rotating body 300 may rotate based on the rotation axis 320 (e.g., x axis). For example, the rotating body 300 may have a rotation parameter according to the rotation. Such a rotation parameter may include at least one of the reference position, the rotation speed, the rotation angle, the rotation direction, and the rotation amount of the rotating body.

The outer surface 310 of the rotating body 300 may include the indicators 311, 312, and 313 having the different reflectivities. For example, the indicators 311, 312, and 313 may be disposed at regular or different intervals on the outside surface of the rotating body 300. For example, some indicators 311 of the indicators 311, 312, and 313 may indicate a reference position of the rotating body 300. The reference position may be a starting point where a series of operations of the rotating body 300 commences.

The detector 330 may emit light to at least some of the indicators 311, 312, and 313 on the outside surface of the rotating body 300, and receive the light reflected from the indicators 311, 312, and 313. For example, the detector 330 may emit light to one or more indicators and receive the light reflected from one or more indicators.

The indicators 311, 312, and 313 may have different reflectivities using at least one of different colors, saturations, and marks. For example, the indicators 311, 312, and 313 may include, but not limited to, tapes, paints, or films having different reflectivities.

FIGS. 4 to 7 depict a pattern of indicators disposed in the rotating body of FIG. 3 according to various embodiments of the present disclosure.

Figure 4:
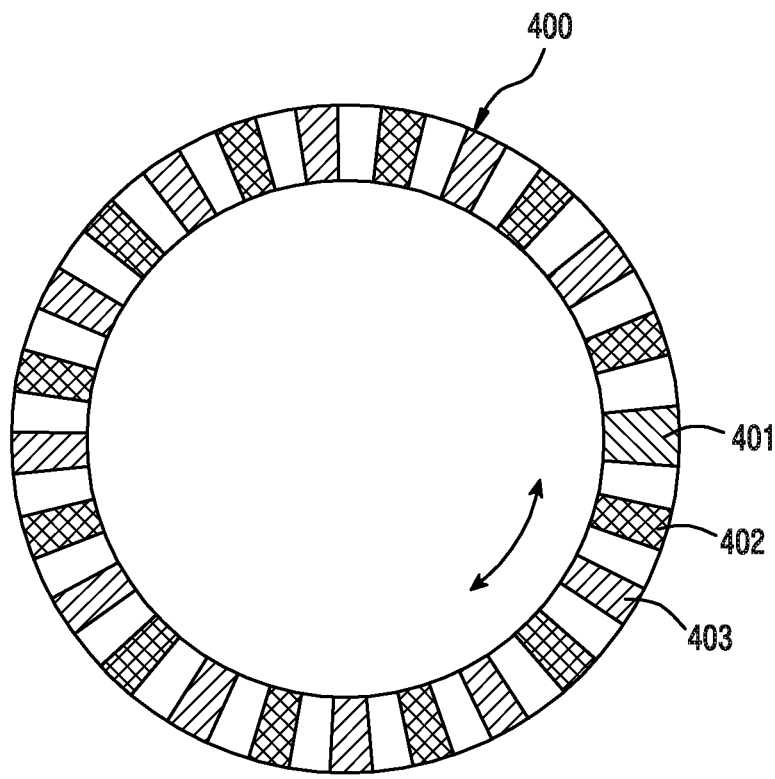
FIGS. 4 to 7 illustrate a pattern of indicators disposed in the rotating body of FIG. 3 according to various embodiments of the present disclosure.

Referring to FIG. 4, a pattern 400 of the indicators includes indicators 401, 402, and 403 of three types. The indicators 401, 402, and 403 may have different reflectivities using at least one of different colors, saturations, and marks. For example, some 401 of the indicators 401, 402, and 403 may indicate a reference position. The remaining indicators 402 and 403 may be disposed, but not limited to, in order or at random.

Figure 5:
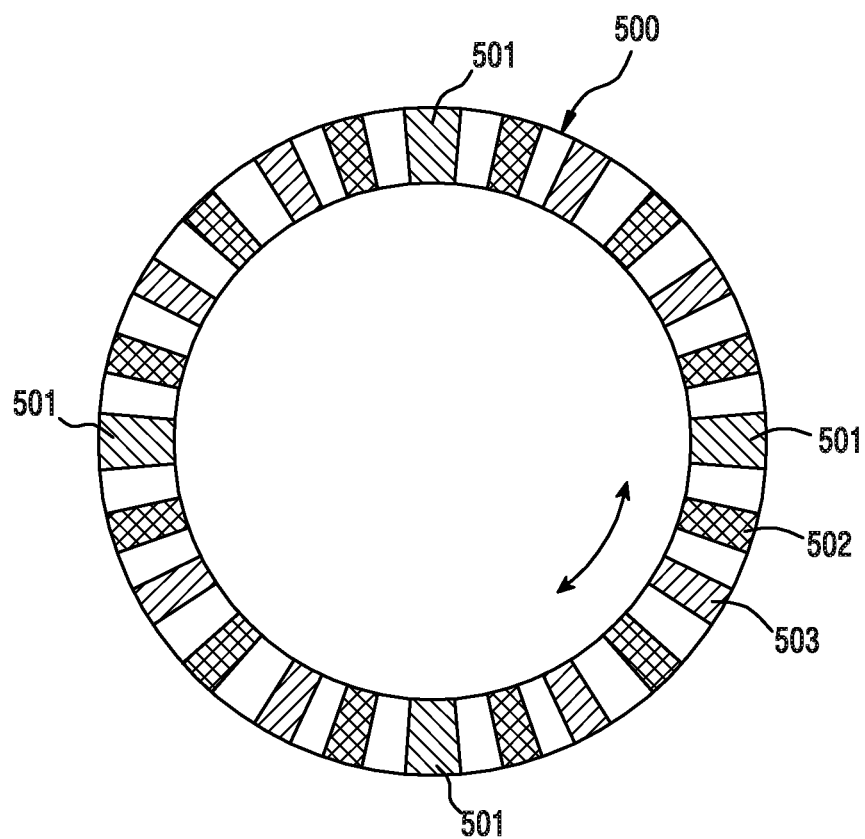

Referring to FIG. 5, a pattern 500 of the indicators includes indicators 501, 502, and 503 of three types. The indicators 501, 502, and 503 may have different reflectivities using at least one of different colors, saturations, and marks. For example, some 501 of the indicators 501, 502, and 503 may indicate a reference position. Some indicators 501 indicating the reference position may be disposed at regular intervals. For example, some indicators 501 may be disposed at, but not limited to, 90 degrees, 180 degrees, 270 degrees, and 360 degrees. For example, some indicators 501 may have the same reflectivity or different reflectivities. The remaining indicators 502 and 503 may be disposed in order or at random.

Figure 6:
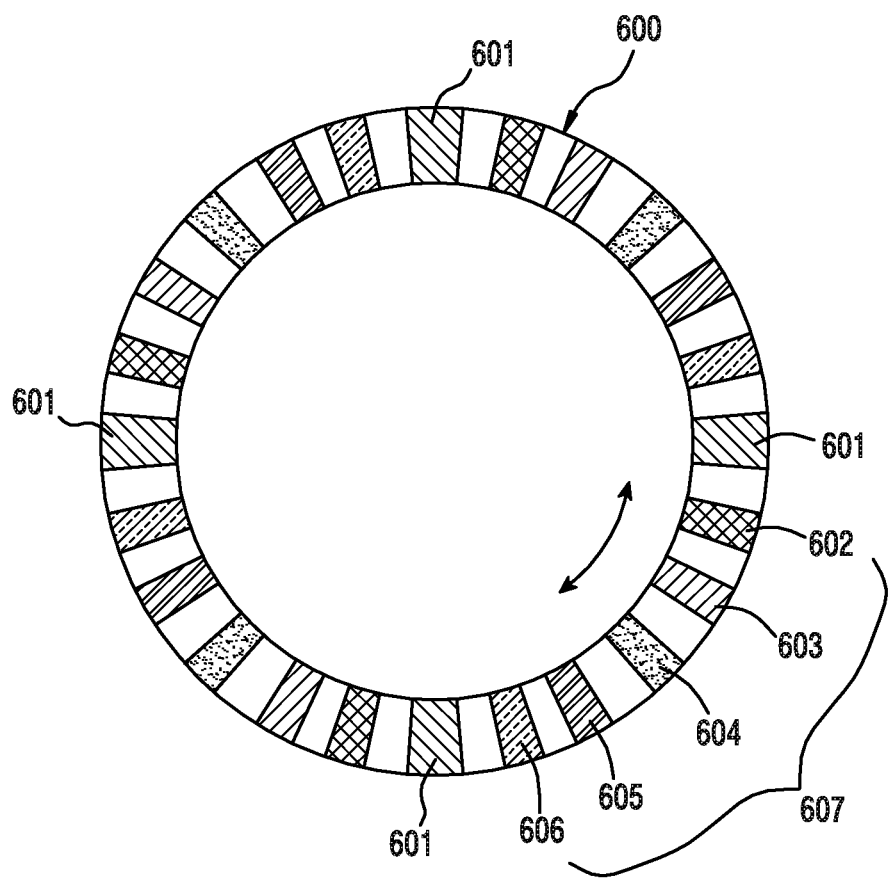

Referring to FIG. 6, a pattern 600 of the indicators includes indicators 601, 602, 603, 604, 605, and 606 of six types. The indicators 601, 602, 603, 604, 605, and 606 may have different reflectivities using at least one of different colors, saturations, and marks. For example, some 601 of the indicators 601, 602, 603, 604, 605, and 606 may indicate a reference position. The some indicators 601 indicating the reference position may be disposed at regular intervals. For example, the some indicators 601 may be disposed at, but not limited to, 90 degrees, 180 degrees, 270 degrees, and 360 degrees. For example, some indicators 601 may have the same reflectivity or different reflectivities. The remaining indicators 602, 603, 604, 605, and 606 may be disposed in order or at random. For example, the remaining indicators 602, 603, 604, 605, and 606 may create patterns 607, and such patterns 607 may be arranged at regular or different intervals.

Figure 7:
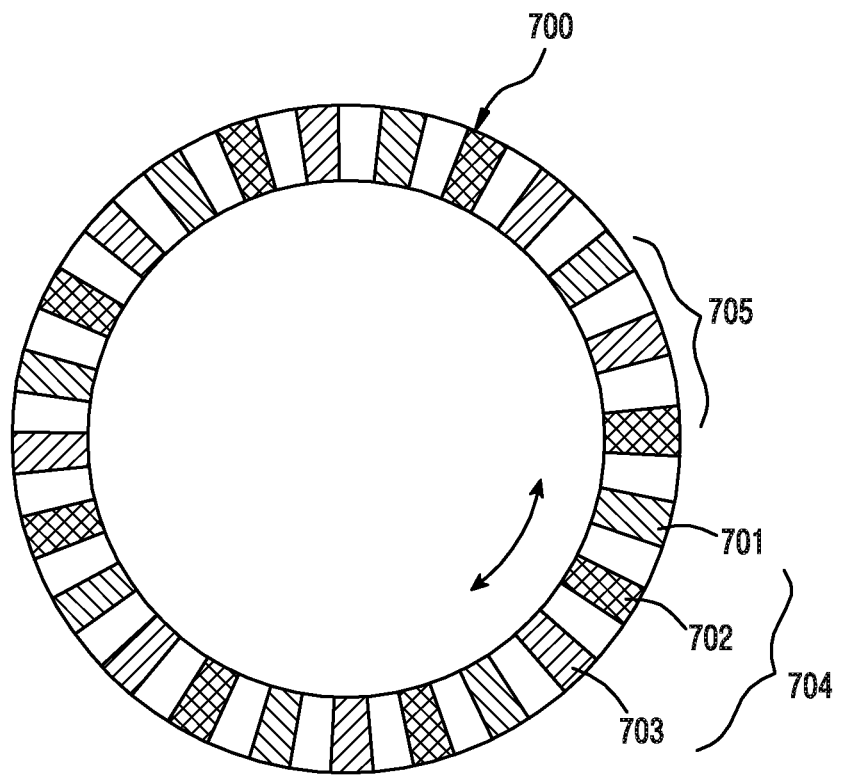

Referring to FIG. 7, a pattern 700 of the indicators includes indicators 701, 702, and 703 of three types. The indicators 701, 702, and 703 may have different reflectivities using at least one of different colors, saturations, and marks. For example, the indicators 701, 702, and 703 may create a plurality of patterns 704 and 705, and some of the patterns 704 and 705 may indicate a reference position. For example, a plurality of patterns 705 may indicate the reference position.

The number, the pattern, or the type of the indicators on the outside surface of the rotating body may increase or decrease. The indicators may be disposed on not only the outside surface of the rotating body but also at least one of an upper surface, a lower surface, and an inside surface of the rotating body.

The indicators may be applied to not only the rotating body which makes the rotational motion but also a device which makes a linear motion.

An electronic device may include a rotating body comprising a plurality of indicators having different reflectivities, a detector comprising a light emitter which emits light to at least some of the indicators and a light receiver which receives light reflected from the indicators, and a processor for detecting a rotation parameter of the rotating body based on an amount of the received light corresponding to the indicators, and controlling the rotating body based on the rotation parameter.

The rotation parameter may include at least one of a reference position, a rotation speed, a rotation angle, a rotation direction, and a rotation amount of the rotating body.

The processor may determine based on the rotation parameter whether a malfunction of the rotating body occurs, and correct driving of the rotating body based on the rotation parameter in response to the malfunction of the rotating body.

In response to the malfunction of the rotating body, the processor may drive the rotating body based on a reference position of the rotating body of the rotation parameter.

In response to the malfunction of the rotating body, the processor may correct a rotation speed of the rotating body based on the rotation parameter.

The processor may determine whether driving of the rotating body abnormally stops, in response to the abnormal stopping of the rotating body, set a reference position of the rotating body to a driving start position based on reference position information of the rotating body of the rotation parameter, and drive the rotating body based on the driving start position.

The processor may detect the reference position of the rotating body based on an amount of the received light corresponding to at least one reference indicator of the indicators.

The indicators may have the different reflectivities using at least one of different colors, saturations, and marks.

The indicators may include at least one of tapes, paints, and films having different reflectivies.

The detector may be a photosensor comprising an infrared LED.

Figure 8:
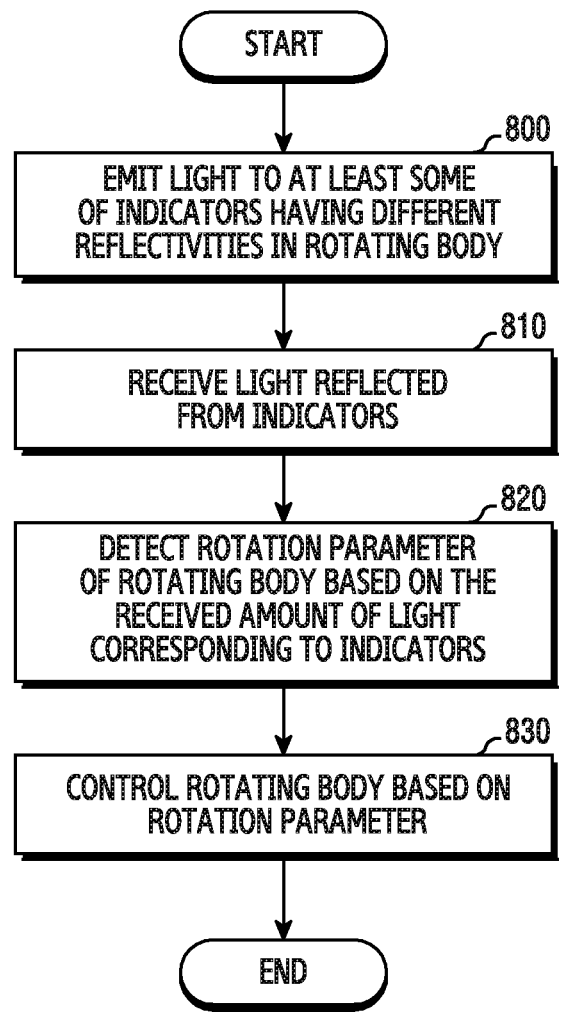
FIG. 8 illustrates a method for controlling a rotating body based on a rotation parameter in an electronic device according to an embodiment of the present disclosure.

FIG. 8 illustrates a method for controlling a rotating body based on a rotation parameter in an electronic device according to an embodiment of the present disclosure.

Referring to FIG. 8, in operation 800, an electronic device (e.g., the electronic device 100) may control to emit light to at least some of indicators having different reflectivities in a rotating body (e.g., the rotating body 160). The indicators may have the different reflectivities using at least one of different colors, saturations, and marks. The indicators may be disposed at regular or different intervals along an outer surface (e.g., an upper surface, a lower surface, an outside surface, or an inside surface) of the rotating body. For example, the electronic device may control to emit the light to at least some of the indicators on the outer surface of the rotating body using a detector (e.g., the detector 150) functionally connected. The detector may be a photosensor including an infrared LED. For example, the electronic device may control the light emitter of the detector to emit the light to one or more indicators on the outer surface of the rotating body.

In operation 810, the electronic device may control to receive the light reflected from the indicators. For example, using the light receiver of the detector, the electronic device may detect the amount of the received light reflected from one or more indicators on the outer surface of the rotating body. For example, using the detector, the electronic device may detect the amount of the received light reflected from one or more indicators disposed at the reference position of the rotating body.

In operation 820, the electronic device may detect the rotation parameter of the rotating body based on the received amount of light corresponding to the indicators. The rotation parameter may include at least one of the reference position, the rotation speed, the rotation angle, the rotation direction, and the rotation amount of the rotating body. For example, the electronic device may have a table of values of the received amounts of light corresponding to one or more indicators disposed in the outer surface of the rotating body. That is, the electronic device may determine which indicator (s) the detected received amount of light corresponds to. Hence, the electronic device may detect the rotation parameter of the rotating body by comparing the received amount of light corresponding to the indicators with the table of values of the received amounts of light.

In operation 830, the electronic device may control the rotating body based on the rotation parameter. For example, the electronic device may correct the driving of the rotating body based on the rotation parameter in response to a malfunction of the rotating body. For example, the electronic device may drive the rotating body based on the reference position of the rotating body of the rotation parameter in response to a malfunction of the rotating body. For example, the electronic device may correct the rotation speed of the rotating body based on the rotation parameter in response to a malfunction of the rotating body.

Figure 9:
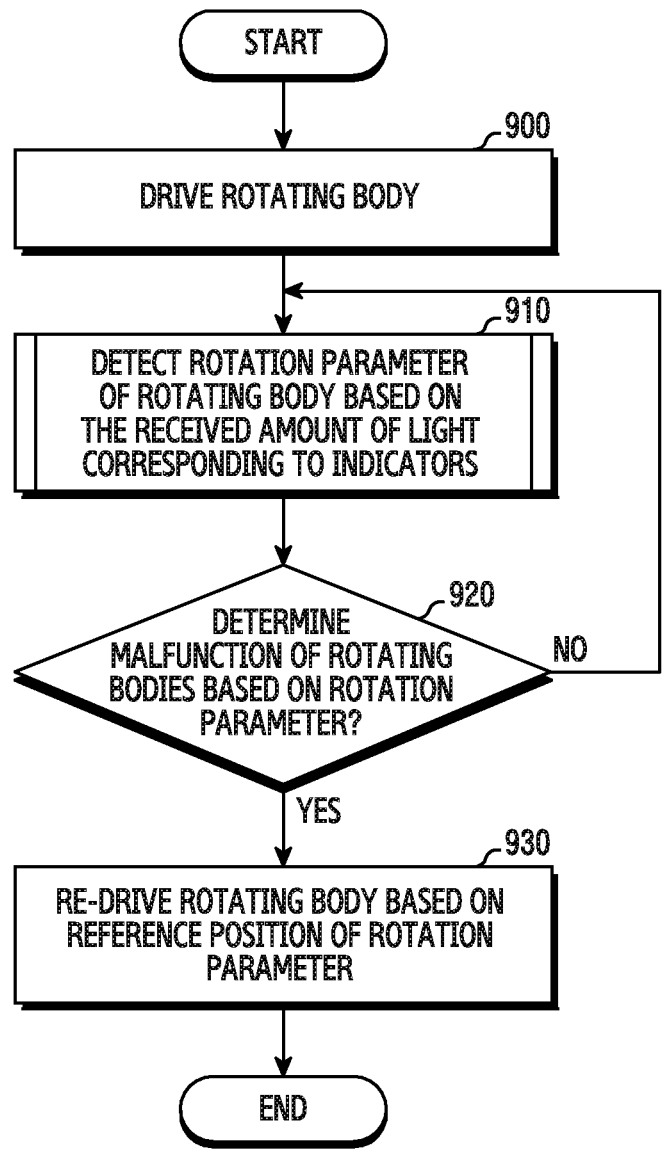
FIG. 9 illustrates a method for controlling a rotating body based on a reference position in an electronic device according to an embodiment of the present disclosure.

FIG. 9 is a flowchart of a method for controlling a rotating body based on a reference position in an electronic device according to an embodiment of the present disclosure.

Referring to FIG. 9, in operation 900, an electronic device (e.g., the electronic device 100) may drive a rotating body (e.g., the rotating body 160). For example, when detecting a rotating body driving signal, the electronic device may drive the rotating body by controlling a motor driving module (e.g., the motor controller 210 and the motor 170).

In operation 910, the electronic device may detect a rotation parameter of the rotating body based on the received amount of light corresponding to the indicators. For example, the electronic device may detect the rotation parameter based on the received amount of light corresponding to the indicators having the different reflectivities of the rotating body in operation 800 through 820 of FIG. 8.

In operation 920, the electronic device may determine based on the rotation parameter whether a malfunction of the rotating body occurs. The malfunction of the rotating body indicates a rotation speed deviation in the rotating body. The malfunction of the rotating body may be caused by an external pressure or shock. For example, the electronic device may detect the malfunction of the rotating body by comparing at least one of the rotation speed, the rotation angle, and the rotation amount of the rotation parameter with at least one of the reference rotation speed, the reference rotation angle, and the reference rotation amount.

Upon detecting the malfunction of the rotating body, the electronic device may re-drive the rotating body based on the reference position of the rotation parameter in operation 930. In response to the malfunction of the rotating body, the electronic device may stop the driving of the rotating body.

For example, the electronic device may turn the rotating body to the reference position of the rotation parameter and then re-drive the rotating body. For example, the electronic device may turn the rotating body from a current position to the reference position and then re-drive the rotating body. When the rotation parameter includes a plurality of reference positions, the electronic device may turn the rotating body to the reference position near the current location and then re-drive the rotating body.

Figure 10:
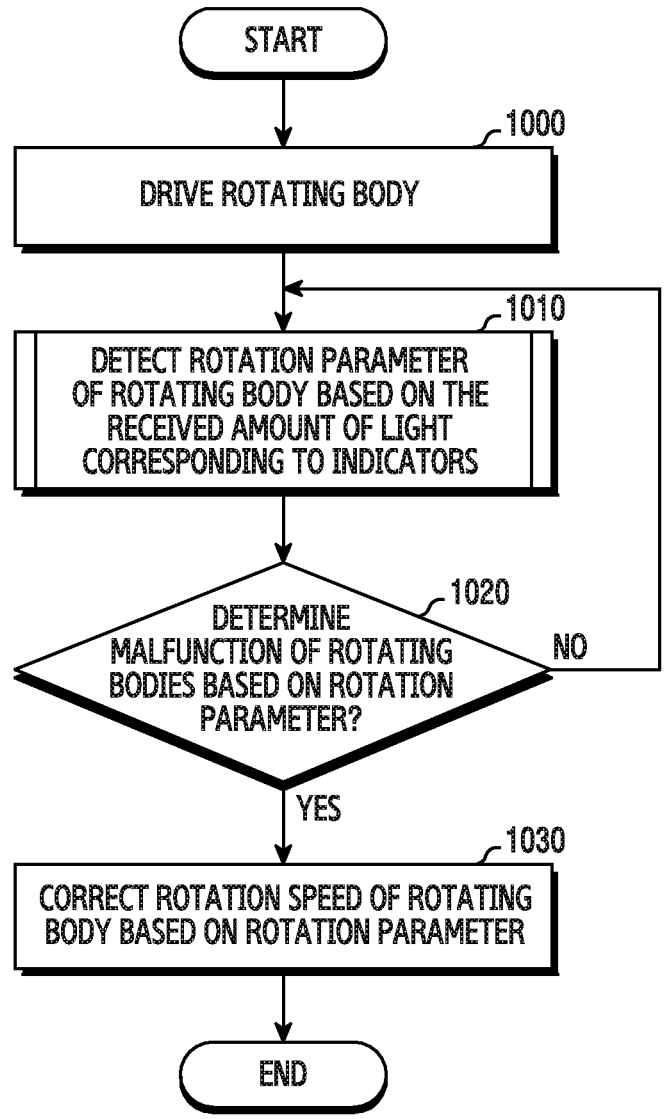
FIG. 10 illustrates a method for controlling a rotating body based on a rotation parameter in an electronic device according to an embodiment of the present disclosure.

FIG. 10 is a flowchart of a method for controlling a rotating body based on a rotation parameter in an electronic device according to an embodiment of the present disclosure.

Referring to FIG. 10, in operation 1000, an electronic device (e.g., the electronic device 100) may drive a rotating body (e.g., the rotating body 160). For example, when detecting a rotating body driving signal, the electronic device may drive the rotating body by controlling a motor driving module (e.g., the motor controller 210 and the motor 170).

In operation 1010, the electronic device may detect a rotation parameter of the rotating body based on a received amount of light corresponding to indicators. For example, For example, the electronic device may detect the rotation parameter based on the received amount of light corresponding to the indicators having the different reflectivities of the rotating body in operation 800 through 820 of FIG. 8.

In operation 1020, the electronic device may determine based on the rotation parameter whether a malfunction of the rotating body occurs. The malfunction of the rotating body indicates a rotation speed deviation in the rotating body. The malfunction of the rotating body may be caused by an external pressure or shock. For example, the electronic device may detect the malfunction of the rotating body by comparing at least one of the rotation speed, the rotation angle, and the rotation amount of the rotation parameter with at least one of the reference rotation speed, the reference rotation angle, and the reference rotation amount.

Upon detecting the malfunction of the rotating body, the electronic device may correct a rotation speed of the rotating body based on the rotation parameter in operation 1030. For example, the electronic device may compare the detected rotation parameter with a reference rotation parameter and thus correct the rotation speed of the rotating body based on a calculated correction value. For example, the electronic device may determine how much the rotation speed of the detected rotation parameter is lower or higher than the reference rotation speed, and thus calculate the correction value of the rotation speed. The electronic device may correct the rotation speed of the rotating body based on the calculated correction value. That is, when the detected rotation parameter is lower than the reference rotation speed, the electronic device may increase the rotation speed of the rotating body. When the detected rotation parameter is higher than the reference rotation speed, the electronic device may decrease the rotation speed of the rotating body.

Figure 11:
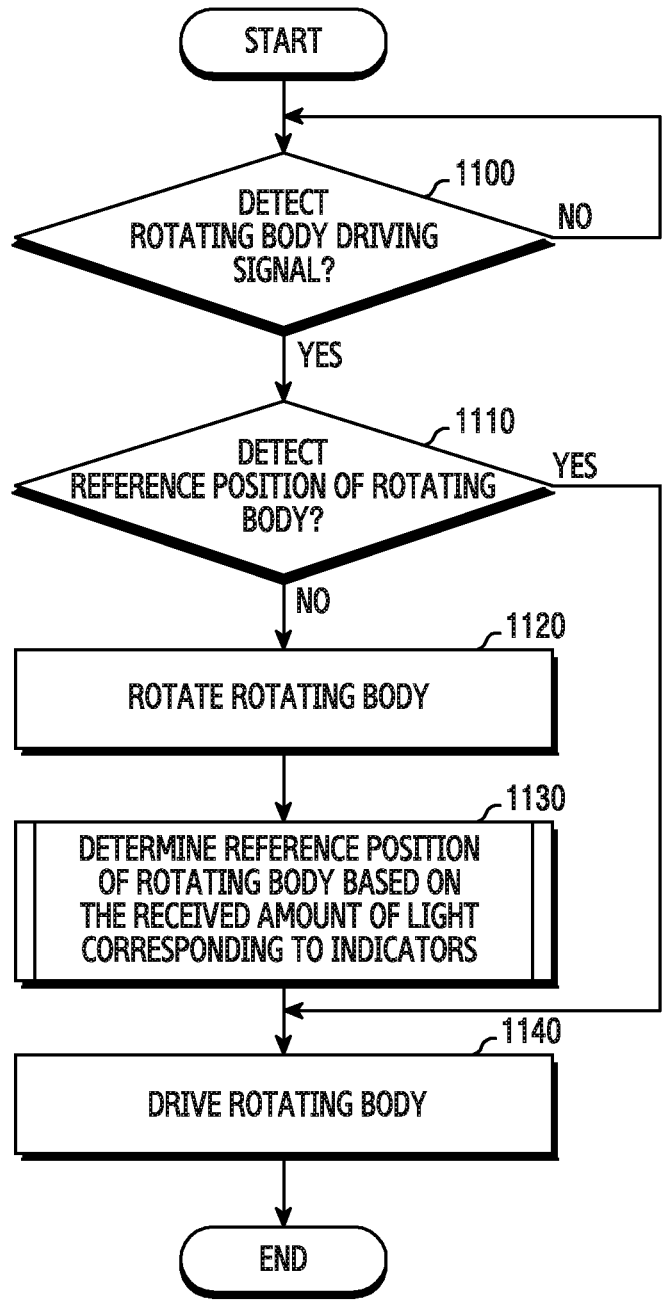
FIG. 11 illustrates a method for controlling a rotating body based on a reference position in an electronic device according to an embodiment of the present disclosure.

FIG. 11 is a flowchart of a method for controlling a rotating body based on a reference position in an electronic device according to an embodiment of the present disclosure.

Referring to FIG. 11, in operation 1100, an electronic device (e.g., the electronic device 100) may determine whether a driving signal of a rotating body (e.g., the rotating body 160) is detected. For example, the electronic device may determine whether the rotating body driving signal is detected while the driving of the rotating body is stopped.

When detecting the rotating body driving signal, the electronic device may determine whether a reference position of the rotating body is detected in operation 1110. For example, the electronic device may emit the light to at least some of the indicators having different reflectivities of the rotating body while the rotating body stops its driving, receive the light reflected from the indicators, and determine based on the received amount of light corresponding to the indicators whether the reference position of the rotating body is detected.

When detecting the reference position of the rotating body, the electronic device may drive the rotating body in operation 1140.

When not detecting the reference position of the rotating body, the electronic device may rotate the rotating body in operation 1120. For example, the electronic device may rotate the rotating body at a constant speed so as to detect the reference position of the rotating body.

In operation 1130, the electronic device may detect the reference position of the rotating body based on the received amount of light corresponding to the indicators. For example, the electronic device may detect the reference position based on the received amount of light corresponding to the indicators having the different reflectivities of the rotating body in operation 800 through 820 of FIG. 8.

In operation 1140, the electronic device may drive the rotating body.

Figure 12:
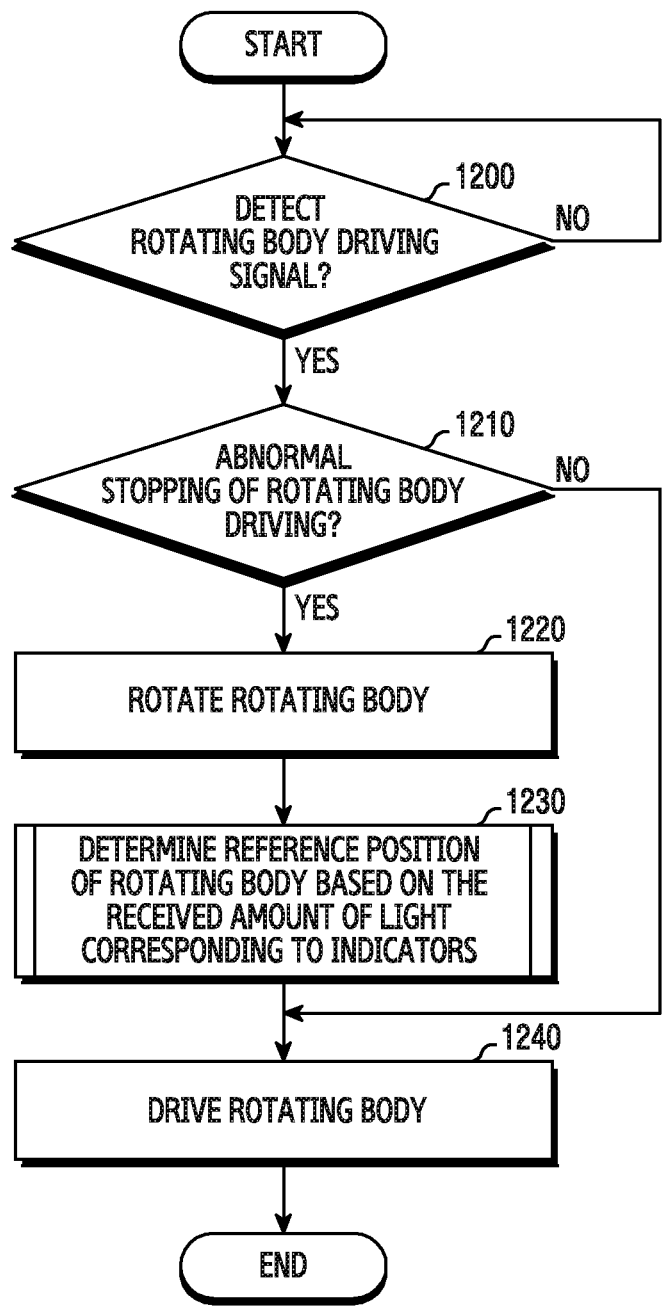
FIG. 12 illustrates a method for controlling a rotating body based on a reference position in an electronic device according to an embodiment of the present disclosure.

FIG. 12 is a flowchart of a method for controlling a rotating body based on a reference position in an electronic device according to an embodiment of the present disclosure.

Referring to FIG. 12, in operation 1200, an electronic device (e.g., the electronic device 100) may determine whether a driving signal of a rotating body (e.g., the rotating body 160) is detected. For example, the electronic device may determine whether the rotating body driving signal is detected while the driving of the rotating body is stopped.

When detecting the rotating body driving signal, the electronic device may determine whether the rotating body driving is abnormally ended in operation 1210. For example, the electronic device may determine whether the rotating body driving is abnormally stopped due to an external pressure or shock or a power failure.

When not detecting the abnormal stopping of the rotating body driving, the electronic device may drive the rotating body in operation 1240.

When detecting the abnormal stopping of the rotating body driving, the electronic device may rotate the rotating body in operation 1220. For example, the electronic device may rotate the rotating body at a constant speed so as to detect the reference position of the rotating body.

In operation 1230, the electronic device may detect the reference position of the rotating body based on the received amount of light corresponding to the indicators. For example, the electronic device may detect the reference position based on the received amount of light corresponding to the indicators having the different reflectivities of the rotating body in operation 800 through 820 of FIG. 8.

In operation 1240, the electronic device may drive the rotating body.

Figure 13:
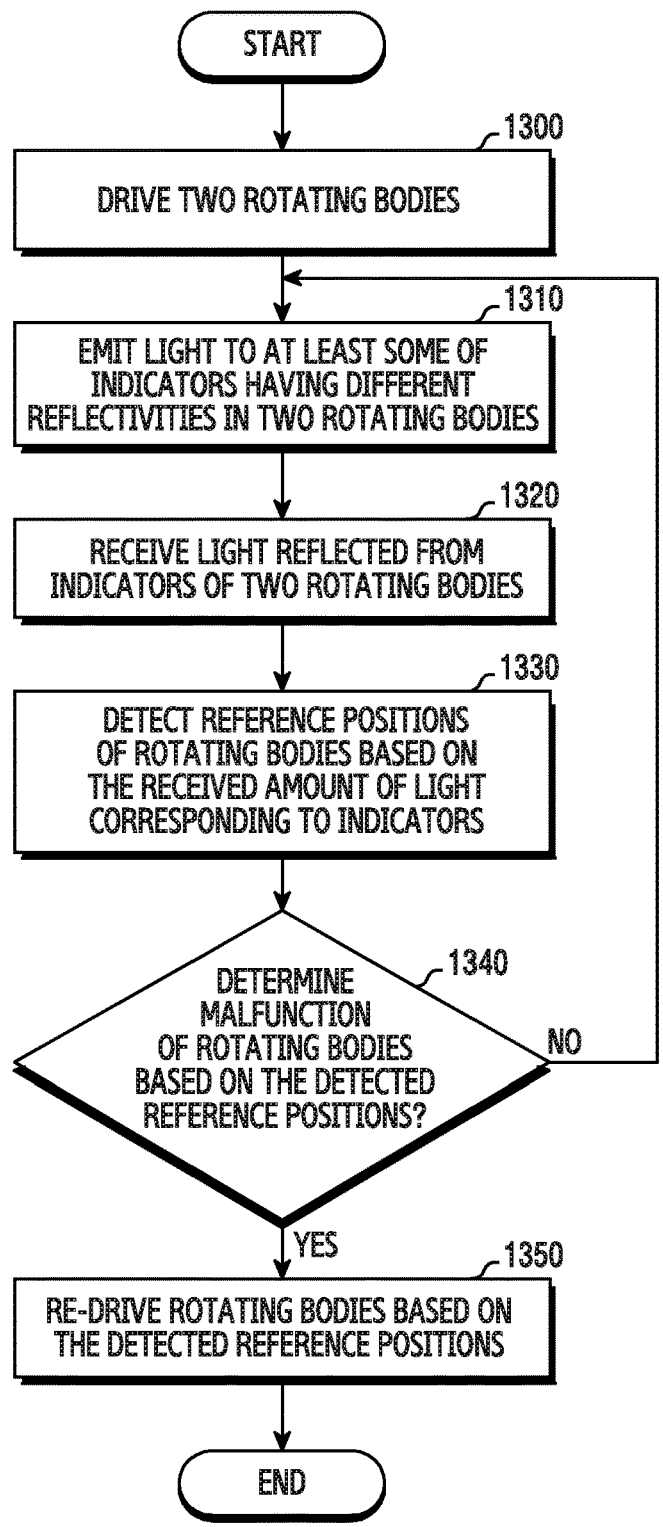
FIG. 13 illustrates a method for controlling a plurality of rotating bodies based on a reference position in an electronic device according to an embodiment of the present disclosure.

FIG. 13 is a flowchart of a method for controlling a plurality of rotating bodies based on a reference position in an electronic device according to an embodiment of the present disclosure.

Referring to FIG. 13, in operation 1300, an electronic device (e.g., the electronic device 100) may drive two rotating bodies. For example, when detecting a rotating body driving signal, the electronic device may drive the rotating bodies by controlling a motor driving module (e.g., the motor controller 210 and the motor 170).

In operation 1310, the electronic device may control to emit light to at least some of indicators having different reflectivities in the rotating bodies. The indicators may have the different reflectivities using at least one of different colors, saturations, and marks. The indicators may be disposed at regular or different intervals along an outer surface (e.g., an upper surface, a lower surface, an outside surface, or an insider surface) of the rotating bodies. For example, the electronic device may control to emit the light to at least some of the indicators on the outer surface of the rotating body using a detector (e.g., the detector 150) functionally connected. The detector may be a photosensor including an infrared LED.

In operation 1320, the electronic device may control to receive the light reflected from the indicators of the two rotating bodies. For example, the electronic device may control the detector to detect the amount of the received light reflected from one or more indicators on the outer surface of the rotating bodies.

In operation 1330, the electronic device may detect reference positions of the rotating bodies based on the received amount of light corresponding to the indicators. For example, the electronic device may have a table of values of the received amounts of light corresponding to the one or more indicators at the reference positions of the rotating bodies. That is, the electronic device may determine which reference indicator(s) the detected received amount of light corresponds to.

In operation 1340, the electronic device may determine based on the detected reference positions whether a malfunction of rotating body occurs. The malfunction of the rotating bodies indicates a rotation speed deviation in the rotating bodies. The malfunction of the rotating bodies may be caused by an external pressure or shock. For example, the rotating bodies may operate independently from or in association with each other.

The rotating bodies may be engaged such that their reference indicators meet at a specific position. In this case, when the rotating bodies normally operate, their reference indicators meet at the specific position. When the rotating bodies abnormally operate, their reference indicators miss the specific position. Hence, the electronic device may determine the malfunction of the rotating bodies.

When not detecting the malfunction of the rotating bodies, the electronic device may return to operation 1310.

When detecting the malfunction of the rotating bodies, the electronic device may re-drive the rotating bodies based on the detected reference positions in operation 1350. In response to the malfunction of the rotating bodies, the electronic device may stop the driving of the rotating bodies. For example, the electronic device may turn the rotating bodies to the detected reference position and then re-drive the rotating bodies.

In various embodiments of the present disclosure, the electronic device may re-drive not only two rotating bodies but also three of more rotating bodies based on the reference position.

A method for operating an electronic device may include emitting light to at least some of indicators having different reflectivities in a rotating body, receiving light reflected from the indicators, detecting a rotation parameter of the rotating body based on an amount of the received light corresponding to the indicators, and controlling the rotating body based on the rotation parameter.

The rotation parameter may include at least one of a reference position, a rotation speed, a rotation angle, a rotation direction, and a rotation amount of the rotating body.

The method may further include determining based on the rotation parameter whether a malfunction of the rotating body occurs, and controlling the rotating body may include correcting driving of the rotating body based on the rotation parameter in response to the malfunction of the rotating body.

Controlling the rotating body may include, in response to the malfunction of the rotating body, driving the rotating body based on a reference position of the rotating body of the rotation parameter.

Controlling the rotating body may include, in response to the malfunction of the rotating body, correcting a rotation speed of the rotating body based on the rotation parameter.

The method may further include determining whether driving of the rotating body abnormally stops. Controlling the rotating body may include, in response to the abnormal stopping of the rotating body, setting a reference position of the rotating body to a driving start position based on reference position information of the rotating body in the rotation parameter, and driving the rotating body based on the driving start position.

The reference position of the rotating body may be detected based on an amount of the received light corresponding to at least one reference indicator of the indicators.

The indicators may have the different reflectivities using at least one of different colors, saturations, and marks.

The aforementioned components of the electronic device according to various embodiments of the present disclosure each may include one or more components, and the name of the corresponding component may differ according to the type of the electronic device. The present electronic device may include at least one of the aforementioned components, omit some components, or further include other components. Also, some of the components of the present electronic device may be united into a single entity to thus carry out the same functions of the corresponding components.

The term "module" used in an embodiment of the present disclosure indicates, for example, a unit including a combination of one or more of hardware, software, or firmware. The "module" may be interchangeably used with the terms, for example, "a unit," "logic," "a logical block," "a component," or "a circuit." The "module" may be a minimum unit or part of the components integrally formed. The "module" may be a minimum unit or part of one or more functions. The "module" may be implemented mechanically or electronically. For example, the "module" may include at least one of an application-specific IC (ASIC), a field-programmable gate array (FPGA), or a programmable-logic device for performing operations which are well known or will be developed.

At least part of the device (e.g., the modules or the functions) or the method (e.g., the operations) described in the appended claims and/or the specification of the present disclosure may be implemented using, for example, instructions stored as the programming module in a non-transitory computer-readable storage medium. For example, when an instruction is executed by one or more processors (e.g., the processor 110), the one or more processors perform the corresponding function. The non-transitory computer-readable storage medium may be, for example, the memory 130.

The non-transitory computer-readable recording medium may include magnetic media such as a hard disk, a floppy disk and a magnetic tape, an optical media such as a compact disc read only memory (CD-ROM) and a DVD, magneto-optical media such as a floptical disk, and hardware devices specifically configured to store and execute an application instruction (e.g., the programming module) such as a ROM, a random access memory (RAM), and a flash memory. A program instruction may include not only machine code made by a compiler but also high-level language code executable by a computer using an interpreter. The above-stated electronic device may serve as one or more software modules for fulfilling the operations of an embodiment of the present disclosure, and vice versa.

The module or the programming module according to an embodiment of the present disclosure may include at least one of the aforementioned components, omit some components, or further include other components. The operations fulfilled by the modules, the programming modules, or other components may be carried out in sequence, in parallel, repeatedly, or heuristically. In addition, some operations may be executed in a different order or omitted, or other operations may be added.

As set forth above, the electronic device and the method according to various embodiments of the present disclosure detects the rotation parameter of the rotating body based on the received amount of light corresponding to the indicators having the different reflectivities of the rotating body, and controls the rotating body based on the detected rotation parameter. Thus, an additional cost for controlling the rotating body may be reduced and the rotating body may be driven more accurately and rapidly.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
    emitting light to a rotating body including a plurality of indicators, the plurality of indicators are being disposed at spaces apart intervals on the rotating body and offset from a rotation axis of the rotating body, wherein the rotating body includes a plurality of rotating bodies which are within a certain distance, and the plurality of rotating bodies respectively include reference indicators;
    detecting an amount of light reflected from each of the plurality of indicators;
    comparing the detected amount of the reflected light for the each of the plurality of indicators with values corresponding to respective ones of the plurality of indicators in a table to determine a rotation parameter of the rotating body, the rotation parameter including at least one of positions of the reference indicators, a rotation speed and a rotation amount of the rotating body;
    detecting a malfunction of the each of the plurality of rotating bodies by identifying whether the reference indicators meet at specific position; and
    controlling a rotation motion of the rotating body based on the detected result of the malfunction and a comparison between the determined rotation parameter and a reference value,
    wherein a first part of the plurality of indicators have a same reflectivity as other indicators, and a second part of the plurality of indicators have a different reflectivity from the other indicators, and
    wherein the determining of the rotation parameter is based on analyzing indicators with the same reflectivity and the different reflectivity.

2. The method of claim 1, wherein controlling the rotation motion of the rotating body based on a comparison between the determined rotation parameter and the reference value comprises:
    calculating a correction value based on the comparison between the determined rotation parameter and the reference value; and
    controlling the rotation speed of the rotating body according to the calculated correction value.

3. The method of claim 1, wherein controlling the rotation motion of the rotating body based on a comparison between the determined rotation parameter and the reference value comprises:
    stopping the rotation of the rotating body.

4. The method of claim 1, wherein controlling the rotation motion of the rotating body based on a comparison between the determined rotation parameter and the reference value comprises:
    re-driving the rotating body to rotate.

5. The method of claim 4,
    wherein controlling the rotation motion of the rotating body based on a comparison between the determined rotation parameter and the reference value comprises:
    setting the reference position of the rotating body to a driving start position based on the specific position; and
    re-rotating the rotating body based on the driving start position.

6. The method of claim 1, wherein the plurality of indicators have different reflectivities using at least one of different colors, saturations, and marks.

7. The method of claim 1, wherein the first part of the plurality of indicators are positioned at fixed positions and the second part of the plurality of indicators are positioned relative to the first part of the plurality of indicators either in order or randomly.

8. An electronic device comprising:
  a rotating body including a plurality of indicators, the plurality of indicators having different reflectivities being disposed at spaces apart intervals on the rotating body and offset from a rotation axis of the rotating body, wherein the rotating body includes a plurality of rotating bodies which are within a certain distance, and the plurality of rotating bodies respectively include reference indicators;
  a detector comprising:
    a light emitter configured to emit light to the rotating body, and
    a light receiver configured to receive light reflected from the at least one indicator; and
  a processor configured to:
    obtain, from the detector, an amount of light reflected from each of the plurality of indicators,
    compare the detected amount of the reflected light for each of the plurality of indicators with values corresponding to respective ones of the plurality of indicators in a table to determine a rotation parameter of the rotating body, the rotation parameter including at least one of positions of the reference indicators, a rotation speed and a rotation amount of the rotating body,
    detect a malfunction of the each of the plurality of rotating bodies by identifying whether the reference indicators meet at specific position, and
    control a rotation motion of the rotating body based on the detected result of the malfunction and a comparison between the determined rotation parameter and a reference value,
  wherein a first part of the plurality of indicators have a same reflectivity as other indicators, and a second part of the plurality of indicators have a different reflectivity from the other indicators, and
  wherein the determining of the rotation parameter is based on analyzing indicators with the same reflectivity and the different reflectivity.

9. The electronic device of claim 8, wherein the processor is further configured to:
  calculate a correction value based on the comparison between the determined rotation parameter and the reference value, and
  control the rotation speed of the rotating body according to the calculated correction value.

10. The electronic device of claim 8,
  wherein the processor is further configured to control the rotation motion of the rotating body by:
  stopping the rotation of the rotating body.

11. The electronic device of claim 8, wherein the processor is further configured to control the rotation motion of the rotating body by:
  re-driving the rotating body to rotate.

12. The electronic device of claim 11,
  wherein the processor is further configured to control the rotation motion of the rotating body by:
  setting the reference position of the rotating body to a driving start position based on the specific position, and
  driver-rotating the rotating body based on the driving start position.

13. The electronic device of claim 8, wherein the plurality of indicators have different reflectivities using at least one of different colors, saturations, and marks.

14. The electronic device of claim 13, wherein the plurality of indicators comprise at least one of tapes, paints, and films having different reflectivities.

15. The electronic device of claim 8, wherein the detector includes a photosensor comprising an infrared light emitting diode (LED).

16. The electronic device of claim 8, wherein the first part of the plurality of indicators are positioned at fixed positions and the second part of the plurality of indicators are positioned relative to the first part of the plurality of indicators either in order or randomly.

* * * * *